United States Patent
Sato et al.

(10) Patent No.: US 8,409,543 B2
(45) Date of Patent: *Apr. 2, 2013

(54) METHOD FOR PREPARING PYROCHLORE-TYPE OXIDE AND METHOD FOR PRODUCING ELECTROCATALYST FOR FUEL CELL

(75) Inventors: Yasushi Sato, Tokyo (JP); Keitaro Fujii, Tokyo (JP)

(73) Assignee: JX Nippon Oil & Energy Corporation, Chiyoda-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/220,981

(22) Filed: Aug. 30, 2011

(65) Prior Publication Data

US 2012/0053045 A1 Mar. 1, 2012

(30) Foreign Application Priority Data

Aug. 30, 2010 (JP) ................. 2010-192287

(51) Int. Cl.
*C01G 55/00* (2006.01)
(52) U.S. Cl. ............. 423/595; 423/594.9; 423/594.14; 423/594.13; 423/599; 502/307
(58) Field of Classification Search ........... 423/593.1, 423/595, 594.9, 594.14, 594.13, 599; 502/307
See application file for complete search history.

(56) References Cited

U.S. PATENT DOCUMENTS 3,801,490 A * 4/1974 Welch ........................ 205/625
4,129,525 A * 12/1978 Horowitz et al. ........ 252/519.13
4,397,774 A * 8/1983 Boonstra et al. ........... 252/518.1
2011/0294652 A1* 12/2011 Sato et al. ....................... 502/1

FOREIGN PATENT DOCUMENTS

| JP | 02-302327 | * 12/1990 |
| JP | 5-36418 A | 2/1993 |
| JP | 2010-184824 | * 8/2010 |

OTHER PUBLICATIONS

Youichi Shimizu et al., Electrocatalytic Properties of Pyrochlore-type Oxides in Acidic Electrolyte, ITE Letters on Batteries, New Technologies & Medicine, vol. 4, No. 5, 2003, pp. 582-586.

D. Saeki et al., Preparation and Fuel Cell Electrode Properties of Metal Phthalocyanine Electrocatalyst Layer by Wet Process, The 49th Battery Symposium in Japan, Nov. 5-7, 2008, 2 pages.

* cited by examiner

*Primary Examiner* — Steven Bos
(74) *Attorney, Agent, or Firm* — Buchanan Ingersoll & Rooney PC

(57) ABSTRACT

A pyrochlore-type oxide represented by a general formula $A_2B_2O_{7-Z}$ is prepared by precipitate formation, where A and B each represent a metal element, where Z represents a number of at least 0 and at most 1, where A contains at least one element selected from a group consisting of Pb, Sn, and Zn, and where B contains at least one element selected from a group consisting of Ru, W, Mo, Ir, Rh, Mn, Cr, and Re. Impurities are then sufficiently removed through washing and drying processes, and the pyrochlore-type oxide is calcined under controlled conditions. This allows the crystallinity of the pyrochlore-type oxide, which contained amorphous parts immediately after the production of the precipitate, to be increased so that the resistance to acid can be improved while preventing particle aggregation.

20 Claims, 3 Drawing Sheets

METHOD FOR PREPARING PYROCHLORE-TYPE OXIDE AND METHOD FOR PRODUCING ELECTROCATALYST FOR FUEL CELL

BACKGROUND OF THE INVENTION

1. Field of the Invention

The present invention relates to platinum-substitute electrocatalysts for fuel cells and to pyrochlore-type oxides that can be used as catalysts thereof.

2. Description of the Related Art

A fuel cell is a device that generates electricity through an electrochemical reaction between hydrogen (fuel) and oxygen. The product of this reaction is water in principle and thus has a small effect on the environment. Thus, fuel cells are expected for applications in a co-generation system for houses and have been developed.

As a catalytic component used as an electrocatalyst for polymer electrolyte fuel cells, a platinum (Pt) or Pt alloy is generally used (Patent document No. 1). However, a Pt is a metal that is very expensive and rare from the aspect of resources, and it is thus concerned that a Pt may become subject to restrictions in terms of cost and depletion of the resources in the future when fuel cells become widely used in the full scale. A problem related to the practical use of a Pt catalyst is that a cathodic overvoltage is large when a Pt is used as a catalyst for cathode and that a decrease in electricity generation efficiency due to the cathodic overvoltage is a limiting factor for an energy reduction effect. It is also a problem from a durability point of view of a Pt catalyst that Pt atoms on a carrier leak in an electrolytic substance in an electrode layer due to, for example, the long-term use or frequent start-stop of the Pt catalyst, resulting in a decrease in a Pt specific surface area associated with an increase in a Pt particle size such that performance degradation is caused. Further, so-called Pt band formation where leaked platinum atoms deposit in an electrolyte membrane is also recognized as a durability-related problem.

In order to overcome these problems, the development of high-performance (less cathodic overvoltage) and high-durability (low solubility into acid electrolytes) non-Pt electrocatalysts is required.

It has already been reported that pyrochlore-type oxide catalysts, represented by PbRu mixed oxide system and PbIr mixed oxide system, exhibit high activity towards an oxygen reduction reaction (ORR) in fuel cell cathodes as non-Pt electrocatalysts. (Non-patent documents No. 1 and No. 2) In general, the following conditions are required for electrocatalysts for fuel cells to achieve high ORR performance: a high activity for each catalyst specific surface area, a large catalyst specific surface area, and, further, a high catalyst conductivity in the case of an oxide catalyst. However, electron transfer in an electrode often serves as reaction control for an ORR in a pyrochlore-type oxide catalyst. This is because particles easily aggregate together at the time of catalyst preparation such that often times only a pyrochlore-type oxide catalyst having a small specific surface area is obtained and is also because the conductivity of the oxide itself is low.

The present inventors have found a technique of synthesizing pyrochlore-type oxide catalysts by a precipitate formation reaction at room temperature so as to prevent such particle aggregation at the time of conventional pyrochlore-type oxide catalyst preparation. Further, the present inventors have been studied a method of preparing a catalyst that can achieve a high ORR activity in an actual membrane electrode assembly (MEA), as a result, by forming precipitates in a state where conducting substances such as carbon powder is suspended in advance at the time of synthesizing the catalyst for a purpose of maintaining conductivity in an electrode catalyst layer so as to reduce the resistance of electron transfer between the catalyst that is obtained and an electrode layer bulk (JP Application No. 2009-022876).

[Patent document No. 1] JP 05-36418

[Non-patent document No. 1] Y. Shimizu et. al., "ITE Letters on Batteries, New Technologies & Medicine," Vol. 4, 2003, p. 582

[Non-Patent document No. 2] D. Saeki et. al., "The 49th Battery Symposium in Japan," proceeding speech 3A21, 2008, p. 89-92

The above-stated preparation method is a process where a precipitate formation reaction is performed at a room temperature and that does not require calcination or the like at high temperature afterward. Therefore, the preparation method is more advantageous than a method, where synthesis of catalysts is performed at higher temperature, in that particle aggregation caused at high temperature can be prevented. (Patent document No. 1) On the other hand, however, the crystallinity of a catalyst that is obtained is low as a pyrochlore-type oxide, and there is room for improvement for the preparation method in terms of the resistance to dissolving of the catalyst and in terms of maintaining an ORR activity.

SUMMARY OF THE INVENTION

In this background, a purpose of the present invention is to provide a method of preparing a pyrochlore-type oxide catalyst described in the following that has a large specific surface area and high crystallinity.

1) A first embodiment of the present invention is a method for preparing a pyrochlore-type oxide. This is a method for preparing a pyrochlore-type oxide represented by a general formula $A_2B_2O_{7-Z}$, where A and B each represent a metal element, where Z represents a number of at least 0 and at most 1, where A contains $A^1$ that is at least one element selected from a group consisting of Pb, Sn, and Zn, and where B contains $B^1$ that is at least one element selected from a group consisting of Ru, W, Mo, Ir, Rh, Mn, Cr, and Re, and comprises: forming a precipitate of the pyrochlore-type oxide by a reaction of a halide or nitrate of said A and an alkaline metal acid of said B; and calcining the precipitate of the pyrochlore-type oxide at a temperature of at least 250 degrees Celsius and at most 900 degrees Celsius.

2) The method for preparing the pyrochlore-type oxide according to the above section 1) may comprise: preparing a first aqueous solution, which is an aqueous solution of the halide or nitrate of said A, and a second aqueous solution, which is an aqueous solution of the alkaline metal acid of said B; forming a precipitate of the pyrochlore-type oxide by carrying out the reaction by dropping one aqueous solution, which is either the first aqueous solution or the second aqueous solution, in the other; and calcining the precipitate of the pyrochlore-type oxide at a temperature of at least 250 degrees Celsius and at most 900 degrees Celsius.

3) The method for preparing the pyrochlore-type oxide according to the above section 2) may further comprise, before the forming of the precipitate of the pyrochlore-type oxide by the dropping, dispersing a conductive material in advance in either the first aqueous solution or the second aqueous solution.

In the method for preparing the pyrochlore-type oxide according to any one of the above sections 1)-3), a reaction temperature during the forming of the precipitate may be at least 0 degrees Celsius and at most 60 degrees Celsius.

In the method for preparing the pyrochlore-type oxide according to any one of the above sections 1)-4), the calcining of the precipitate of the pyrochlore-type oxide may be carried out in an inert gas atmosphere.

6) In the method for preparing the pyrochlore-type oxide according to any one of the above sections 1)-5), said A may contain a metal $A^2$, which is different from said $A^1$, and/or said B may contain a metal $B^2$, which is different from said $B^1$, and said $A^2$ and said $B^2$ may each independently represent at least one element selected from a group consisting of Be, Mg, Ca, Sr, Ba, Sc, Y, Ti, Zr, Hf, V, Nb, Ta, Cr, Mo, W, Mn, Re, Fe, Os, Co, Rh, Ni, Pd, Cu, Al, Ga, In, Ge, As, Sb, Bi, La, Ce, Pr, Nd, Pm, Sm, Eu, Gd, Dy, Ho, Er, Tm, Yb, and Lu.

In the method for preparing the pyrochlore-type oxide according to any one of the above sections 1)-6), $A(NO_3)_2$ may be used as a precursor of said A, and $K_2BO_4$ or $Na_2BO_4$ may be used as a precursor of said B.

In the method for preparing the pyrochlore-type oxide according to the above section 7), said $A(NO_3)_2$ may contain at least $Pb(NO_3)_2$ or $Sn(NO_3)_2$, said $K_2BO_4$ may be $K_2RuO_4$, and said $Na_2BO_4$ may be $Na_2RuO_4$.

9) A second embodiment of the present invention is a method for producing an electrocatalyst for a fuel cell. This is a method for producing an electrocatalyst for a fuel cell that contains a pyrochlore-type oxide represented by a general formula $A_2B_2O_{7-Z}$, where A and B each represent a metal element, where Z represents a number of at least 0 and at most 1, where A contains $A^1$ that is at least one element selected from Pb, Sn, and Zn, and where B contains $B^1$ that is at least one element selected from Ru, W, Mo, Ir, Rh, Mn, Cr, and Re, and comprises: forming a precipitate by a reaction of a halide or nitrate of said A and an alkaline metal acid of said B; and calcining the precipitate of the pyrochlore-type oxide at a temperature of at least 250 degrees Celsius and at most 900 degrees Celsius in an inert gas atmosphere such as nitrogen.

10) The method for producing an electrocatalyst for a fuel cell according to the above section 9) may comprise: preparing a first aqueous solution, which is an aqueous solution of the halide or nitrate of said A, and a second aqueous solution, which is an aqueous solution of the alkaline metal acid of said B; forming a precipitate of the pyrochlore-type oxide by carrying out the reaction by dropping one aqueous solution, which is either the first aqueous solution or the second aqueous solution, in the other; and calcining the precipitate of the pyrochlore-type oxide at a temperature of at least 250 degrees Celsius and at most 900 degrees Celsius.

11) In the method for producing an electrocatalyst for a fuel cell according to the above section 10), the dropping may be carried out after dispersing a conductive material in advance in either the first aqueous solution or the second aqueous solution so as to form the pyrochlore-type oxide on the conductive material.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

Figure 1:
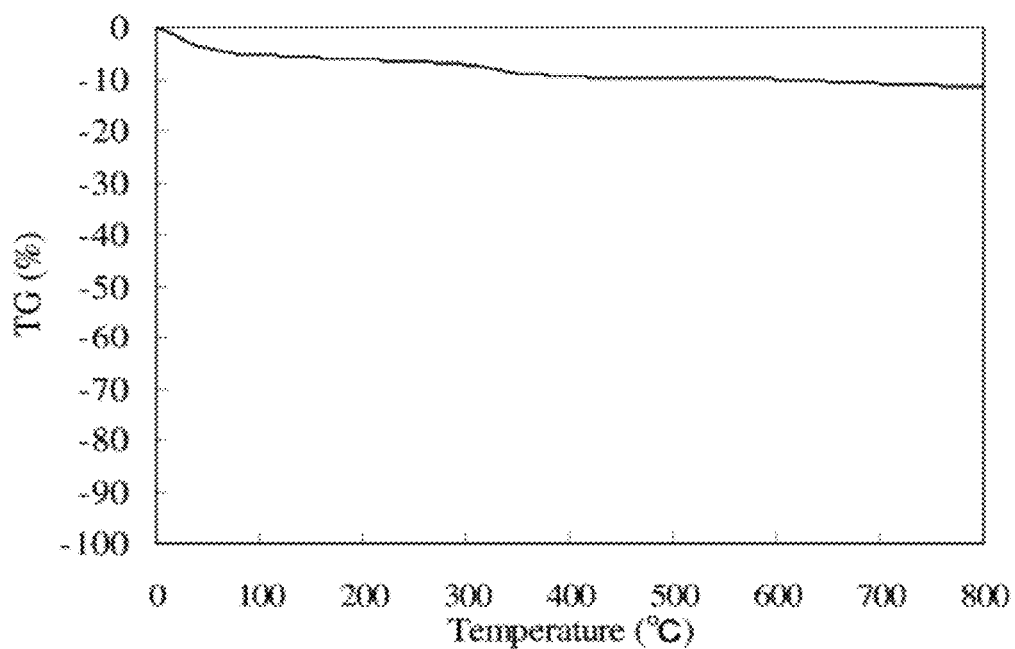
FIG. 1 is a graph illustrating a TG-DTA measurement result of an oxide whose composition is represented by $Pb_2Ru_2O_{7-Z}$ (A=Pb, B=Ru)

The invention will now be described by reference to the preferred embodiments. This does not intend to limit the scope of the present invention, but to exemplify the invention.

Described below is an explanation of the embodiments of the present invention with reference to figures.

According to the present invention, a pyrochlore-type oxide catalyst can be produced at an approximate room temperature in a liquid phase. An oxide can be obtained whose particle size immediately after precipitate formation is smaller than that obtained by a conventional method of preparing a pyrochlore-type oxide catalyst, which is represented by the one described in patent document No. 1, by performing a solution reaction related to precipitate formation under a mild condition of near room temperature. The growth of a particle being produced can be suppressed.

It has been confirmed that a part of the precipitate formed at an approximate room temperature is already in a state of a pyrochlore-type oxide and exhibits an activity as an electrode catalyst. However, depending on the composition of the pyrochlore-type oxide and the condition of the precipitate formation, there are occasions when a pyrochlore-type crystal is not sufficiently obtained only through the precipitate formation or the subsequent operation of washing and drying.

Generally in oxide catalysts in an amorphous state where crystallization does not occur, elution of a metal oxide and a change in the oxidation number occur due to a reaction condition such as the acidity of an electrolytic substance contained in the electrode catalyst layer, a potential during the generation of an electricity, and an oxidation atmosphere in the case of a cathode catalyst, and an electrode activity is often lost over a period of use. Increasing the crystallinity is a means for alleviating these concerns related to durability.

More specifically, while maintaining a fine particle size obtained immediately after the precipitate formation to some extent, the crystallinity can be increased by removing almost all the moisture from a composition, which is obtained in a mixed state of crystal and amorphous after the precipitation, by a drying process after removing impurities by water washing and then by calcining the composition again under the air or an inert gas atmosphere such as nitrogen.

In the present invention, a halide or a nitrate of A is often referred to as a precursor of A, and an alkaline metal acid of B is often referred to as a precursor of B.

Described below is a detailed explanation of the embodiments of the present invention.

(Synthesis of Pyrochlore-Type Oxide By Precipitate Formation Reaction)

A detailed description will now be made regarding a method of synthesizing a pyrochlore-type oxide of the present invention by a precipitate formation reaction.

(Basic Method of Forming Pyrochlore-Type Oxide Precipitate)

A pyrochlore-type oxide represented by a general formula $A_2B_2O_{7-Z}$ is produced where A represents at least one element (referred to as $A^1$) selected from Pb, Sn, and Zn and where B represents at least one element (referred to as $B^1$) selected from Ru, W, Mo, Ir, Rh, Mn, Cr, and Re.

In an aqueous solution (a first aqueous solution) of the halide or nitrate of the metal A, an aqueous solution (a second aqueous solution) of the alkaline metal acid of the metal B is dropped. Alternatively, in the solution (the second aqueous solution) of the alkaline metal acid of the metal B, the aqueous solution (the first aqueous solution) of the halide or nitrate of the metal A is dropped. This allows the halide or nitrate of the metal A and the alkaline metal acid of the metal B to react to form a precipitate.

It is preferable that the amount used of a aqueous solution to be dropped, either the first or second aqueous solution, is approximately the stoichiometric amount of the amount used of the other aqueous solution at this time. The stoichiometric amount means a stoichiometric ratio of the metal A and the metal B that are included in the pyrochlore-type oxide composition obtained as a final product and does not always correspond to a neutralization point of an acid-base reaction. There are occasions where it is necessary to excessively use either a salt containing A or a salt containing B as necessary for the completion of the reaction. However, even in this case, it is preferable that the amount of a chemical species to be excessively added does not exceed 1.2 times the stoichiometry.

Preferably, the reaction temperature in the pyrochlore-type oxide preparation is an approximate room temperature. More specifically, the approximate room temperature means a temperature of at least 0 degrees Celsius and at most 60 degrees Celsius and preferably at least 10 degrees Celsius and at most 50 degrees Celsius. Setting the reaction temperature to be at least 0 degrees Celsius and further at least 10 degrees Celsius prevents the solubility, in an aqueous solution, of the respective precursors of A and B from being lowered, excellently preventing the precursors from depositing during the reaction or dropping. Setting the reaction temperature to be at most 60 degrees Celsius and further at most 50 degrees Celsius excellently prevents the specific surface area from decreasing due to the aggregation of the precipitate of a pyrochlore compound that is obtained.

Also, the temperature at which the metal salt aqueous solutions (the first aqueous solution and the second aqueous solution) are used is preferably at least 0 degrees Celsius and more preferably at least 10 degrees Celsius from the aspect of preventing precursor deposition and is preferably at most 60 degrees Celsius and more preferably at most 50 degrees Celsius from the aspect of preventing precipitate aggregation.

It is preferable to keep stirring without stopping with use of a magnetic stirrer, a mechanical agitation blade, etc., during the dropping so that approximately uniform dispersion is obtained. Purified water (ion-exchanged water) may be appropriately added, if necessary, for a purpose of achieving a physically uniform mixture state of the mixture at this time.

The respective concentrations of the metal salt aqueous solutions (the concentration of the halide or nitrate of the metal A in the first aqueous solution and the concentration of the alkaline metal acid of the metal B in the second aqueous solution) are preferably in a range of 5-500 mmol/L and more preferably in a range of 10-300 mmol/L. When the aqueous solution concentration is at least 5 mmol/L, a situation can be easily prevented where the efficiency is lost due to a reduction in yield with respect to the reaction scale. When the aqueous solution concentration is at most 500 mmol/L, the aqueous solution can be easily prevented from being unstable from the aspect of deposition or the like, and a situation can thus be easily prevented where aggregation is accelerated due to a localized reaction that occurs during the precipitation.

(When Part of A Site and/or B Site is Replaced with Another Metal)

A pyrochlore-type oxide according to the present embodiment has a composition where a part of an A site and/or a part of a B site are replaced (also referred to as doping) with other metals in a pyrochlore-type oxide (A=$A^1$, B=$B^1$) that is obtained by the above-stated basic method for preparing a pyrochlore-type oxide. The catalyst activity can often be improved by the doping, and the embodiment is effective for this purpose.

In other words, the A contains a metal (referred to as $A^2$) that is different from the $A^1$, and/or the B contains a metal (referred to as $B^2$) that is different from the $B^1$, in this embodiment (the metals $A^2$ and $B^2$ are referred to as doping metals in some cases in the following).

Preferably, the metals $A^2$ and $B^2$ each independently represent at least one element selected from Be, Mg, Ca, Sr, Ba, Sc, Y, Ti, Zr, Hf, V, Nb, Ta, Cr, Mo, W, Mn, Re, Fe, Os, Co, Rh, Ni, Pd, Cu, Al, Ga, In, Ge, As, Sb, Bi, La, Ce, Pr, Nd, Pm, Sm, Eu, Gd, Dy, Ho, Er, Tm, Yb, and Lu. When using these metals, one of the metals may be independently used, or a combination of two or more of the metals may be used.

In the case of the metal $A^2$, these doping metals can be dissolved, in advance, in the aqueous solution of a halide or nitrate of the metal $A^1$, which is a raw material of the metal $A^2$, when preparing a pyrochlore-type oxide.

In the case of the metal $B^2$, these doping metals can be dissolved, in advance, in the aqueous solution of an alkaline metal acid of the metal $B^1$, which is a raw material of the metal $B^2$. These metals $A^2$ and $B^2$ can be dissolved in a salt form in the respective aqueous solutions. As a salt of the metal $A^2$, a salt that can be stably dissolved in an aqueous solution, in which a metal salt of $A^1$ is dissolved, can be used. As a salt of the metal $B^2$, a salt that can be stably dissolved in an aqueous solution, in which a metal salt of $B^1$ is dissolved, can be used. For example, a halide or nitrate of $A^2$ can be used as a salt of $A^2$, and an alkaline metal acid of $B^2$ can be used as a salt of $B^2$.

The amount of these doping metals to be added can be adjusted, for example, such that the chemical formula satisfies $A^1_{2-x}A^2_xB^1_{2-y}B^2_yO_{7-z}$ (note that X, Y, and Z are equal to or more than 0 and are equal to or less than 1).

In the present invention, a pyrochlore-type oxide can be synthesized at an approximate room temperature in a liquid phase. It is desirable that the BET specific surface area of a pyrochlore-type oxide is at least 20 $m^2/g$, and a pyrochlore-type oxide having such a specific surface area can be obtained in this invention.

(When Supported on Catalyst Carrier)

A pyrochlore-type oxide produced by the present invention is useful as a catalyst for promoting an electrode reaction. Electric conductivity suitable for an electrode reaction can be maintained by using, as such an electrode catalyst, a pyrochlore-type oxide mixed with a solid conductive material such as carbon, and a void is ensured that is used for suitably spreading a reactive gas such as a fuel gas or an oxidant gas. Therefore, the further improvement of the oxygen reduction activity of an obtained electrode catalyst can be ensured.

The pyrochlore-type oxide and the solid conductive material may be physically mixed for use by a mixer such as a mortar and a ball mill. Preferably, the pyrochlore-type oxide and the conductive material coexist from the point of precipitate formation precipitate formation during the synthesis, and the conductive material plays a role of a carrier of a pyrochlore-type oxide precipitate. Allowing the solid conductive material to function as the carrier as described above can improve the dispersibility of the pyrochlore-type oxide. Thus, a catalyst can be obtained that has larger catalyst specific surface area and that is highly stable and highly active.

A solid, particularly, a solid particle that is insoluble to water, which is a solvent used at the time of the synthesis, can be used as the solid conductive material. Preferably, the solid conductive material is a porous material with an appropriate particle size and specific surface area. From this aspect, mainly, a material that contains carbon as a major component is preferably used. However, a material used as the solid conductive material is not specifically limited as long as the material can support a pyrochlore-type oxide in a desired dispersion state. More preferably, the material has a certain degree of proton conductivity as well as electric conductivity or is able to keep a medium that conducts protons. From this aspect, a porous carbon carrier such as carbon black is preferably used.

Specifically, a material that represents one element or a mixture of at least two elements that is/are selected from a group consisting of acetylene black, ketjen black, vulcan, black pearl, graphitized acetylene black, graphitized vulcan, graphitized ketjen black, graphitized black pearl, carbon nanotube, carbon nanofiber, carbon nanohorn, carbon fibril, and the like is preferably used as a material that is used as the conductive material and that contains carbon as a major component.

Preferably, the BET specific surface area of the conductive material is at least $80 \text{ m}^2/\text{g}$ from the aspect of supporting a pyrochlore-type oxide in a high dispersion state. When the specific surface area is at least $80 \text{ m}^2/\text{g}$, the dispersibility of a catalytic component on the conductive material is suitable, and suitable electric generation performance can be obtained.

The size of the conductive material is not limited specifically. The average diameter thereof is desirably 5-200 nm and, preferably, about 10-100 nm from the aspect of, for example, the ease of the supporting and of controlling a catalyst utilization rate in an appropriate range. The average diameter of the conductive material can be measured and calculated by TEM observation.

In a conductive material supported pyrochlore-type oxide catalyst, the pyrochlore-type oxide content is preferably 5-90 percent by mass of the total amount of the pyrochlore-type oxide and the conductive material. When the pyrochlore-type oxide content is at most 90 percent by mass, the degree of dispersion of the catalytic component on the conductive material is easily improved, and an effect of improving electric generation performance, which is due to the increase in the supporting amount, can be obtained. When the supporting amount is at least 5 percent by mass, a catalyst activity per unit mass is suitable, thus allowing a situation to be easily prevented where a large amount of electrode catalyst is required for obtaining a desired catalyst activity.

These conductive materials can be dispersed in advance in the aqueous solution (the first aqueous solution) of the halide or nitrate of the metal A, which is a raw material, or in the aqueous solution (the second aqueous solution) of the alkaline metal acid of the metal B, when preparing a pyrochlore-type oxide.

(Post-Treatment after Precipitate Formation)

After forming a pyrochlore-type oxide or a composition of a pyrochlore-type oxide and a conductive material thereof as a precipitate, as described above, a precipitate containing the pyrochlore-type oxide can be separated and collected from the reaction system by filtration, centrifugal separation, or the like. The obtained pyrochlore-type oxide is usually a black or brownish-red solid. Preferably, the obtained pyrochlore-type oxide is washed by a technique of, for example, passing a cleaning medium such as purified water or repeating suspension or filtration so that impurities, such as residual ions, obtained as by-products at the time of the precipitate formation are removed. The temperature may also be an approximate room temperature at this time.

Almost all the moisture contained in a pyrochlore-type oxide precipitate that is separated and collected after the washing is usually removed by a drying process. A means such as a circulation drying furnace or a steam dryer can be generally used for the drying as long as the means can heat the precipitate while circulating gas such as air or nitrogen or under reduced pressure. Preferably, the temperature at the time of the drying is below calcination temperature that is described later. More specifically, the temperature at the time of the drying is in a range of at least 60 degrees Celsius and at most 200 degrees Celsius and preferably at least 80 degrees Celsius and at most 150 degrees Celsius. When the temperature is below 60 degrees Celsius, the drying takes time since the moisture cannot be efficiently removed from the precipitate. When the temperature exceeds 200 degrees Celsius, the particles of the oxide may aggregate together since the precipitate is heated while containing moisture.

The drying time cannot be generalized due to the above drying means or temperature; however, the drying time is usually in a range of 1 minute to 72 hours, preferably in a range of 5 minutes to 36 hours, and more preferably in a range of 10 minutes to 24 hours. When the drying time is shorter than 1 minute, the moisture may not be fully removed even with use of an efficient drying means. The drying time that exceeds 72 hours is not preferable in the aspect of production load, and there is a concern for particle aggregation of the oxide that is being dried.

A pyrochlore-type oxide, which is obtained as a precipitate after such a drying process, can be obtained in a dried powder form. A high degree of dryness is preferable, and the loss of ignition (LOI) based on the Japanese Industrial Standards is usually in a range of at most 10 percent, preferably in a range of at most 5 percent, and more preferably in a range of at most 3 percent. The drying is obviously insufficient when the LOI is 10 percent or more, and there is a concern that particle aggregation of the oxide may occur at an early stage of calcination if the process is moved to the subsequent calcination process with this LOI.

(Calcination Process)

In a pyrochlore-type oxide obtained by the preparation method of the present invention, the particle size of the pyrochlore-type oxide formed as a precipitate is small due to a synthesis condition at low temperature. However, depending on the composition or precipitate formation condition of the pyrochlore-type oxide, the pyrochlore-type oxide obtained only through the precipitate formation, the washing and filtration, and the drying process, as described above, often does not exhibit crystallinity that is sufficient for a pyrochlore-type oxide. Thus, further performing an calcination process on the above-obtained pyrochlore-type oxide allows the crystallinity of the pyrochlore-type oxide after the precipitation to be increased while preventing particle aggregation due to high temperature. An explanation is given in the following regarding a specific method thereof.

The oxide is required to be fully dried prior to heating the oxide after the precipitation. As described previously, it is known that aggregation of oxide particles is promoted by a hydrothermal reaction when calcination is performed under high moisture content where the LOI is high. Therefore, the oxide is preferably dried as much as possible before the calcination.

Calcination is most easily performed in the air. However, there are occasions when calcination is preferably performed in the atmosphere or flow of inert gas such as nitrogen, helium, or argon, in the case of the following reasons.

In the above-stated composition of a pyrochlore-type oxide and a conductive material thereof, the occasions when calcination is preferably performed under inert gas are, for example, when a combustible substance such as carbon is used as the conductive material and when an increase in the average oxidation number of the pyrochlore oxide due to calcination in the air is undesired. In either case, oxygen in the calcination system is preferably shut off to a certain concentration or below by replacing the atmosphere in the calcination system with appropriate inert gas or by maintaining an inert gas atmosphere by circulation. The oxygen concentration at the time of using the inert gas cannot be generalized due to the necessary conditions for shutting off the oxygen; however, the oxygen concentration is usually in a range of at most 1 percent, preferably in a range of at most 5000 ppm, and more preferably in a range of at most 1000 ppm.

An explanation is now given of the temperature and time for performing calcination under these calcination requirements. Since the purpose of the calcination of the present invention is to increase the crystallinity of a crude pyrochlore-type oxide obtained as a precipitate, the calcination requirements are preferably performed, by necessity, at or above transition temperature of the transition from an amorphous state to a crystalline layer. Prior to the calcination, it is preferable to acquire knowledge regarding the crystalline transition temperature and the weight reduction starting temperature by means of a differential scanning calorimeter (DSC) and by thermogravimetry differential thermal analysis (TG-DTA). As an example, a description is given of an oxide whose composition is represented by $Pb_2Ru_2O_{7-Z}$ (A=Pb, B=Ru). FIG. 1 is a graph illustrating a TG-DTA measurement result of an oxide whose composition is represented by $Pb_2Ru_2O_{7-Z}$ (A=Pb, B=Ru). As shown in FIG. 1, regarding the oxide after precipitation, washing, and drying, a slow decrease in weight is observed from around 100 degrees Celsius, a step-like decrease in weight is observed at around 300 degrees Celsius, and a slight decrease in weight is observed at and above 500 degrees Celsius according to the TG-DTA measurement. In consideration of these results, two conditions, for example, 350 degrees Celsius and 600 degrees Celsius, are selected as calcination temperature.

The optimal calcination temperature cannot be generalized since the optimal calcination temperature depends on the composition and the condition, after the precipitate formation, of a pyrochlore-type oxide as described above; however, the optimal calcination temperature is usually in a range of 250-900 degrees Celsius and preferably in a range of 300-700 degrees Celsius. The calcination temperature of 250 degrees Celsius or below is often insufficient in the aspect of crystallization. When the temperature that exceeds 900 degrees Celsius is applied, particle aggregation cannot often be avoided even in an oxide after drying. Thus, either of the cases is not preferable.

Similarly, it is difficult to unequivocally set the range of the calcination time; however, the calcination time is usually in a range of 5 minutes to 36 hours and preferably in a range of 10 minutes to 24 hours. A sufficient calcination effect may not be obtained when the calcination time is 5 minutes or below, and, in addition to poor productivity, particle aggregation may progress when the calcination time exceeds 36 hours.

Figure 2:
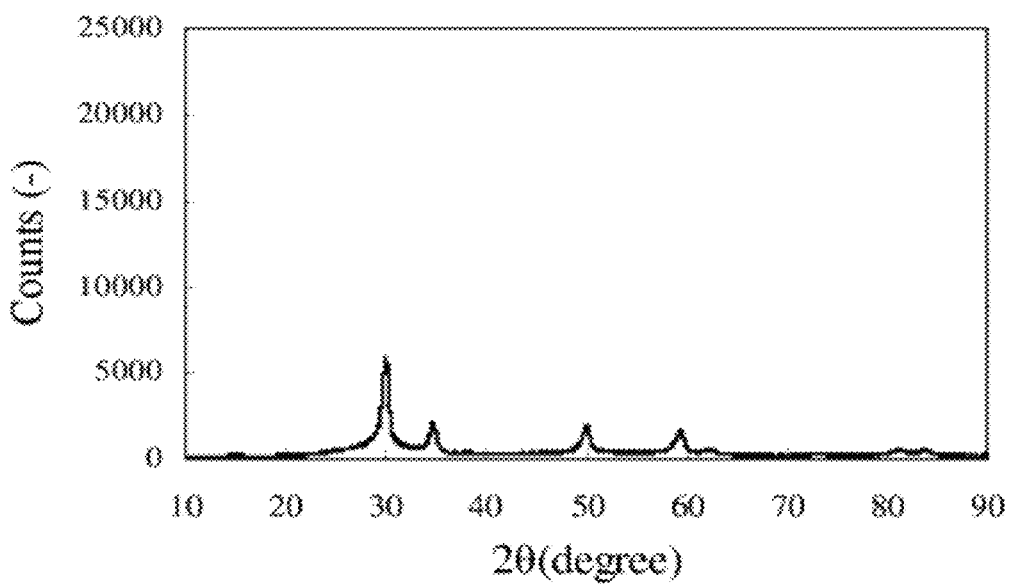
FIG. 2 is a graph illustrating an XRD measurement result of a pyrochlore-type oxide before calcination.
Figure 3:
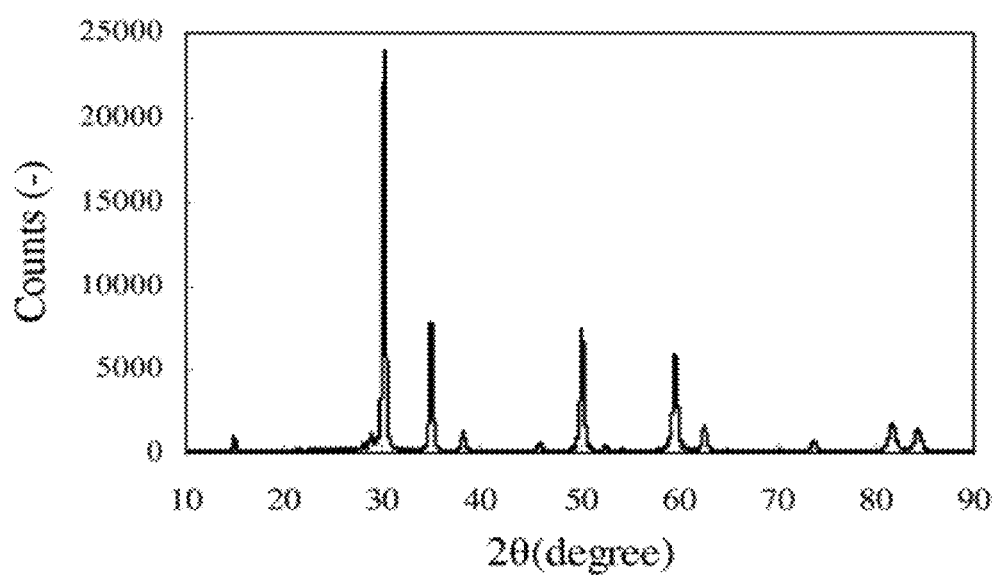
FIG. 3 is a graph illustrating an XRD measurement result of the pyrochlore-type oxide after calcination.

FIGS. 2 and 3 are graphs each illustrating an XRD measurement result of a pyrochlore-type oxide before and after calcination. As shown in FIGS. 2 and 3, a pyrochlore-type oxide before the calcination contains many amorphous phases and shows broad peaks; on the other hand, the peaks that clearly result from a pyrochlore-type crystal lattice become sharp in the pyrochlore-type oxide after the calcination.

Figure 4:
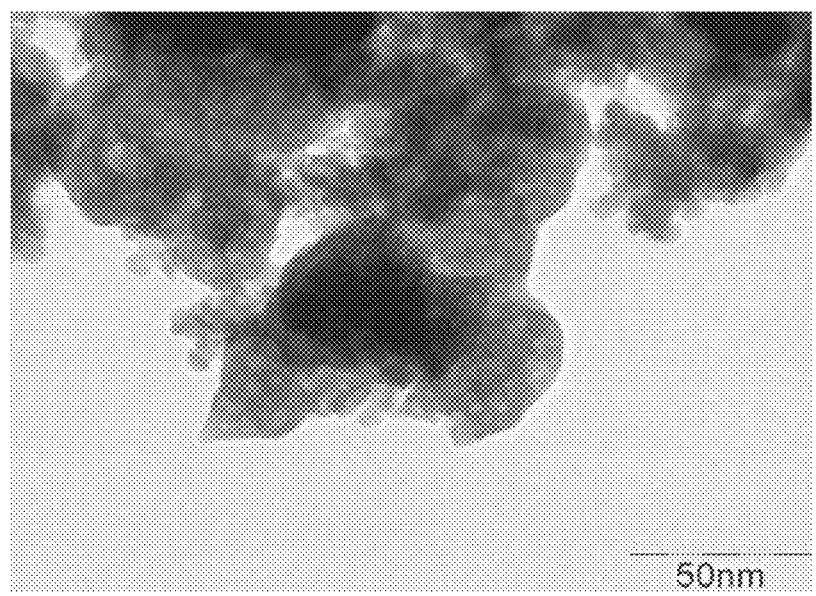
FIG. 4 is a TEM image of the pyrochlore-type oxide before calcination.
Figure 5:
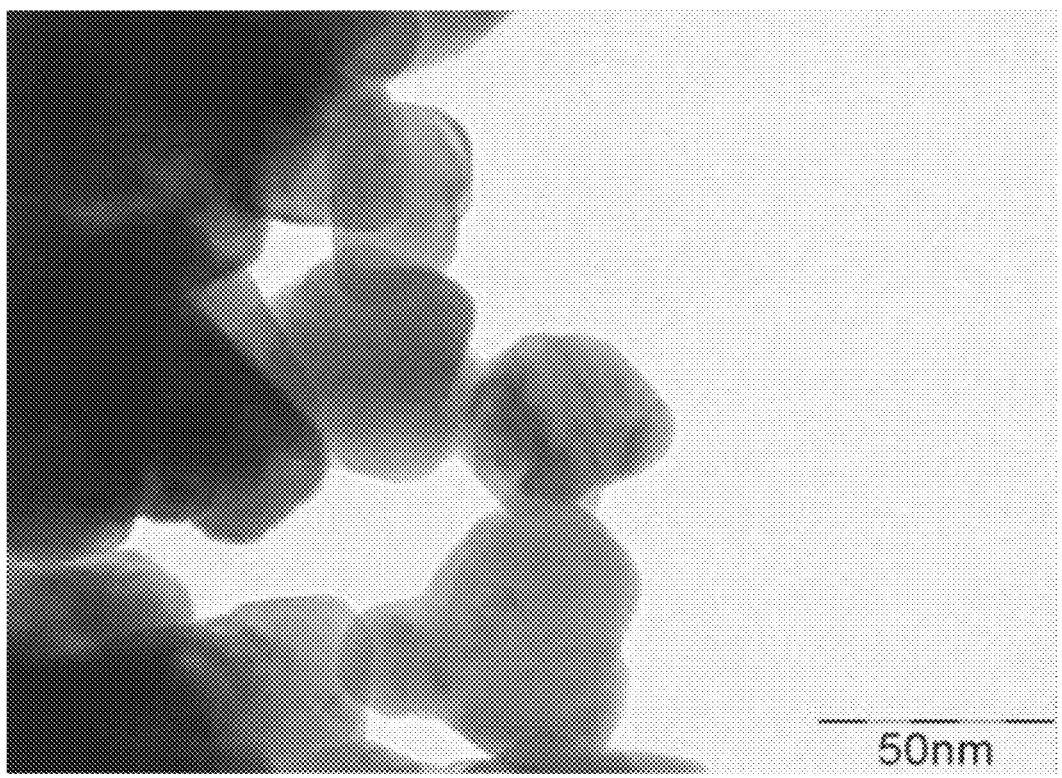
FIG. 5 is a TEM image of the pyrochlore-type oxide after calcination.

FIGS. 4 and 5 are graphs each illustrating a TEM image of a pyrochlore-type oxide before and after calcination. As shown in FIGS. 4 and 5, although increased contrast due to an increase in crystallinity is observed when compared to a pyrochlore-type oxide before calcination, no notable increase is observed in a particle size in a pyrochlore-type oxide that was calcined under proper calcination requirements.

Upon examining solubility to acid by element determination by using ICP atomic emission spectrometry on the supernatant of the above-stated pyrochlore-type oxide, with increased crystallinity due to the calcination, after immersing the pyrochlore-type oxide for 24 hours in 1N nitric acid, it is obvious that the resistance to acid is improved in the pyrochlore-type oxide after the calcination compared to the one that is not calcined. Thus, the pyrochlore-type oxide, after the calcination can be expected to show long-term durability even when used for an electrode catalyst of a fuel cell that uses a highly acidic electrolyte such as perfluorosulfonic acid.

A pyrochlore-type oxide obtained by the present invention can be used as an alternative to an electrode catalyst obtained by supporting noble metal particles and/or noble metal alloy particles on the electrode catalyst (e.g., conductive material) used for a conventional polymer electrolyte fuel cell or can be used as an electrocatalyst for a fuel cell by mixing the pyrochlore-type oxide in a part of a composition of a conventional catalyst, in other words, in a conventional catalyst.

When applying a pyrochlore-type oxide of the present invention to an electrode of a fuel cell, the pyrochlore-type oxide may be used for either an anode or a cathode or may be used for both anode and cathode electrodes.

Using an electrocatalyst for a polymer electrolyte fuel cell as an example, an explanation is given in the above regarding an application of a pyrochlore-type oxide produced according to the present invention. However, the application is not limited to this, and the pyrochlore-type oxide produced according to the present invention can be used as an electrocatalyst for various fuel cells such as an alkaline fuel cell, a phosphoric acid fuel cell, a direct methanol fuel cell, a direct organic hydride fuel cell, and a micro fuel cell. Further, the pyrochlore-type oxide produced according to the present invention may be applicable to a so-called high temperature fuel cell, such as a solid oxide fuel cell or a molten carbonate fuel cell, as long as a catalyst system thereof exhibits a certain level of high-thermal stability. Further, the application of the pyrochlore-type oxide produced according to the present invention is not limited to an electrocatalyst for fuel cell, and the pyrochlore-type oxide can be appropriately used for other applications, for example, in an electrolytic gas generator.

Exemplary Embodiments

Exemplary embodiments are listed in the following, and a detailed description is given of the present invention. However, the present invention is not limited to these exemplary embodiments.

(Exemplary Embodiment 1-1) Preparation of Pyrochlore-Type Oxide $Pb_2Ru_2O_{7-Z}$ A 0.5 mol/L lead(II) nitrate aqueous solution obtained by dissolving lead(II) nitrate $(Pb(NO_3)_2)$ in purified water was poured into a beaker. While stirring the aqueous solution at room temperature (about 25 degrees Celsius), a 0.5 mol/L potassium ruthenate aqueous solution obtained by dissolving potassium ruthenate $(K_2RuO_4)$ in purified water was dropped so that the molar ratio of Pb to Ru is 1 to 1. Then, a precipitate produced in the beaker was filtered off and washed with purified water, and a produced pyrochlore-type oxide was taken out and dried for 12 hours at 120 degrees Celsius in flowing air. The LOI of a product after the drying was 3.5 percent, and the BET specific surface area was 69 m²/g. Crystal structure analysis by XRD was performed. However, the peak was broad at this stage, and it was thus unable to specify the specific crystal structure to which the product belongs.

The product was transferred in a porcelain crucible and calcined in air in a muffle furnace. The calcination was carried out at 150 degrees Celsius for 1 hour, and the calcination temperature was then raised at a rate of 5 degrees Celsius/minute to 400 degrees Celsius and kept at the temperature for 6 hours. After the temperature was lowered to the room temperature, the product was taken out. The BET specific surface area was 62 m²/g, and a peak particular to a pyrochlore lattice was observed in XRD. A peak half-width obtained based on the measurement and an average particle size that can be obtained by the Scherrer's equation were approximately about 10 nm. Thus, it was confirmed that almost no particle aggregation occurred due to the calcination.

(Exemplary Embodiment 1-2) Preparation of Pyrochlore-Type Oxide $Sn_2Ru_2O_{7-Z}$ A 0.5 mol/L tin(II) nitrate aqueous solution obtained by dissolving tin(II) nitrate ($Sn(NO_3)_2$) in purified water was poured into a beaker. While stirring the aqueous solution at room temperature (about 25 degrees Celsius), a 0.5 mol/L potassium ruthenate aqueous solution obtained by dissolving potassium ruthenate ($K_2RuO_4$) in purified water was dropped so that the molar ratio of Sn to Ru is 1 to 1. Then, a precipitate produced in the beaker was filtered off and washed with purified water, and a produced pyrochlore-type oxide was taken out and dried for 12 hours at 120 degrees Celsius in flowing air. The LOI of a product after the drying was 2.7 percent, and the BET specific surface area was 47 m²/g. Crystal structure analysis by XRD was performed. However, the peaks were broad at this stage, and it was thus unable to specify the specific crystal structure to which the product belongs.

The product was transferred in a porcelain crucible and calcined in air in a muffle furnace. The calcination was carried out at 150 degrees Celsius for 1 hour, and the calcination temperature was then raised at a rate of 5 degrees Celsius/minute to 600 degrees Celsius and kept at the temperature for 8 hours. After the temperature was lowered to the room temperature, the product was taken out. The BET specific surface area was 37 m²/g, and a peak particular to a pyrochlore lattice was observed in XRD. A peak half-width obtained based on the measurement and an average particle size that can be obtained by the Scherrer's equation were approximately about 15 nm. Thus, it was confirmed that almost no particle aggregation occurred due to the calcination.

One gram of this oxide was suspended in 100 mL of 1N hydrochloric acid and stirred for 72 hours at room temperature. The elements of the supernatant were then analyzed by using ICP atomic emission spectrometry. The elemental concentration was found to be 0.1 atomic percent or less for both Rb and Ru, which were constituent elements of the pyrochlore-type oxide.

(Exemplary Embodiment 2-1) Preparation of Carbon-Supported Pyrochlore-Type Oxide $Pb_2Ru_2O_{7-Z}/C$ A 0.5 mol/L lead(II) nitrate aqueous solution obtained by dissolving lead(II) nitrate ($Pb(NO_3)_2$) in purified water was poured into a beaker. While stirring the aqueous solution at room temperature (about 25 degrees Celsius), carbon powder was dispersed. Ketjen black having a specific surface area of 800 m²/g, which was obtained from Tanaka Kikinzoku Kogyo K.K., was used as the carbon powder. While keeping the stirring of the aqueous solution, a 0.5 mol/L potassium ruthenate aqueous solution obtained by dissolving potassium ruthenate ($K_2RuO_4$) in purified water was dropped.

Then, a precipitate produced in the beaker was filtered off, washed with purified water, and then dried for 8 hours at 80 degrees Celsius under vacuum (100 torr). The LOI of a product after the drying was 6.8 percent, and the BET specific surface area was 85 m²/g. Crystal structure analysis by XRD was performed. Only a peak resulting from carbon (a graphite structure) was observed, and a peak resulting from a pyrochlore-type oxide could not be identified.

The product was transferred in a reaction tube, which was a silica tube with a flat perforated plate filled with glass wool, and calcined in inert gas by heating the surrounding thereof in an electric furnace while flowing helium gas at a rate of 100 mL/minute. During the calcination, the calcination temperature was raised to 350 degrees Celsius in 3 hours and kept at the temperature for 6 hours. After the temperature was lowered to the room temperature, the product was taken out. The BET specific surface area was 95 m²/g, and a peak particular to a pyrochlore lattice was observed, in addition to a broad halo of a graphite structure, in XRD. A peak half-width obtained based on the measurement and an average particle size that can be obtained by the Scherrer's equation were about 5 nm. Thus, it was confirmed that almost no particle aggregation occurred due to the calcination.

Comparative Example 1

When Pyrochlore-Type Oxide $Pb_2Ru_2O_{7-Z}$ is not Calcined

The precipitate produced by the method of the exemplary embodiment 1-1 was filtered off and washed with purified water, and a produced pyrochlore-type oxide was then taken out. One gram of this oxide was suspended in 100 mL of 1N hydrochloric acid and stirred for 72 hours at room temperature. The supernatant showed reddish brown that was obviously originated from Ru ions. The elements of the supernatant were then analyzed by using ICP atomic emission spectrometry. The elemental concentration was found to be 11.7 atomic percent for Pb and 7.6 atomic percent for Ru, Pb and Ru being constituent elements of the pyrochlore-type oxide.

These embodiments are intended to be illustrative only, and it will be obvious to those skilled in the art that various modifications could be developed based on the knowledge of a skilled person and that such modifications are also within the scope of the present invention.

What is claimed is:

1. A method for preparing a pyrochlore oxide represented by a general formula $A_2B_2O_{7-z}$, where A and B each represent a metal element, where $0 \leq Z \leq 1$, where A contains $A'$ that is at least one element selected from the group consisting of Pb, Sn, and Zn, and where B contains $B^1$ that is at least one element selected from the group consisting of Ru, W, Mo, Ir, Rh, Mn, Cr, and Re, the method comprising:

forming a precipitate of the pyrochlore oxide by reaction of a halide or nitrate of said A and an alkaline metal acid of said B; and calcining the precipitate of the pyrochlore oxide at a temperature of at least 250° C. and at most 900° C. in an inert gas atmosphere.

2. The method for preparing the pyrochlore oxide according to claim 1 comprising:

preparing a first aqueous solution, of the halide or nitrate of said A, and a second aqueous solution, of the alkaline metal acid of said B;

forming a precipitate of the pyrochlore oxide by carrying out the reaction by dropping one aqueous solution, which is either the first aqueous solution or the second aqueous solution, in the other; and calcining the precipitate of the pyrochlore oxide at a temperature of at least 250° C. and at most 900° C.

3. The method for preparing the pyrochlore oxide according to claim 2 further comprising, before the forming of the precipitate of the pyrochlore oxide by the dropping, dispersing a conductive material in either the first aqueous solution or the second aqueous solution.

4. The method for preparing the pyrochlore oxide according to claim 1, wherein a reaction temperature during the forming of the precipitate is at least 0° C. and at most 60° C.

5. The method for preparing the pyrochlore oxide according to claim 2, wherein a reaction temperature during the forming of the precipitate is at least 0° C. and at most 60° C.

6. The method for preparing the pyrochlore oxide according to claim 3, wherein a reaction temperature during the forming of the precipitate is at least 0° C. and at most 60° C.

7. The method for preparing the pyrochlore oxide according to claim 1, wherein said A contains a metal $A^2$, which is different from said $A^1$, and/or said B contains a metal $B^2$, which is different from said $B^1$, and said $A^2$ and said $B^2$ each independently represent at least one element selected from the group consisting of Be, Mg, Ca, Sr, Ba, Sc, Y, Ti, Zr, Hf, V, Nb, Ta, Cr, Mo, W, Mn, Re, Fe, Os, Co, Rh, Ni, Pd, Cu, Al, Ga, In, Ge, As, Sb, Bi, La, Ce, Pr, Nd, Pm, Sm, Eu, Gd, Dy, Ho, Er, Tm, Yb, and Lu.

8. The method for preparing the pyrochlore oxide according to claim 2, wherein said A contains a metal $A^2$, which is different from said $A^1$, and/or said B contains a metal $B^2$, which is different from said $B^1$, and said $A^2$ and said $B^2$ each independently represent at least one element selected from the group consisting of Be, Mg, Ca, Sr, Ba, Sc, Y, Ti, Zr, Hf, V, Nb, Ta, Cr, Mo, W, Mn, Re, Fe, Os, Co, Rh, Ni, Pd, Cu, Al, Ga, In, Ge, As, Sb, Bi, La, Ce, Pr, Nd, Pm, Sm, Eu, Gd, Dy, Ho, Er, Tm, Yb, and Lu.

9. The method for preparing the pyrochlore oxide according to claim 3, wherein said A contains a metal $A^2$, which is different from said $A^1$, and/or said B contains a metal $B^2$, which is different from said $B^1$, and said $A^2$ and said $B^2$ each independently represent at least one element selected from the group consisting of Be, Mg, Ca, Sr, Ba, Sc, Y, Ti, Zr, Hf, V, Nb, Ta, Cr, Mo, W, Mn, Re, Fe, Os, Co, Rh, Ni, Pd, Cu, Al, Ga, In, Ge, As, Sb, Bi, La, Ce, Pr, Nd, Pm, Sm, Eu, Gd, Dy, Ho, Er, Tm, Yb, and Lu.

10. The method for preparing the pyrochlore oxide according to claim 4, wherein said A contains a metal $A^2$, which is different from said $A^1$, and/or said B contains a metal $B^2$, which is different from said $B^1$, and said $A^2$ and said $B^2$ each independently represent at least one element selected from the group consisting of Be, Mg, Ca, Sr, Ba, Sc, Y, Ti, Zr, Hf, V, Nb, Ta, Cr, Mo, W, Mn, Re, Fe, Os, Co, Rh, Ni, Pd, Cu, Al, Ga, In, Ge, As, Sb, Bi, La, Ce, Pr, Nd, Pm, Sm, Eu, Gd, Dy, Ho, Er, Tm, Yb, and Lu.

11. The method for preparing the pyrochlore oxide according to claim 1, wherein $A(NO_3)_2$ is the precursor of said A, and $K_2BO_4$ or $Na_2BO_4$ is the precursor of said B.

12. The method for preparing the pyrochlore oxide according to claim 11, wherein said $A(NO_3)_2$ includes at least $Pb(NO_3)_2$ or $Sn(NO_3)_2$, said $K_2BO_4$ is $K_2RuO_4$, and said $Na_2BO_4$ is $Na_2RuO_4$.

13. The method for preparing a pyrochlore oxide according to claim 1, wherein the inert gas is selected from the group consisting of nitrogen, helium, argon and a combination thereof.

14. The method for preparing a pyrochlore oxide according to claim 1, wherein the precipitate of the pyrochlore oxide is calcined at a temperature of at least 250° C. and at most 600° C.

15. A method for producing an electrocatalyst for a fuel cell that contains a pyrochlore oxide represented by a general formula $A_2B_2O_{7-Z}$, where A and B each represent a metal element, where $0 \leq Z \leq 1$, where A contains $A^1$ that is at least one element selected from the group consisting of Pb, Sn, and Zn, and where B contains $B^1$ that is at least one element selected from the group consisting of Ru, W, Mo, Ir, Rh, Mn, Cr, and Re, the method comprising:

forming a precipitate by reaction of a halide or nitrate of said A and an alkaline metal acid of said B; and calcining the precipitate of the pyrochlore oxide at a temperature of at least 250° C. and at most 900° C. in an inert gas atmosphere.

16. The method for preparing the pyrochlore oxide according to claim 15, wherein said A contains a metal $A^2$, which is different from said $A^1$, and/or said B contains a metal $B^2$, which is different from said $B^1$, and said $A^2$ and said $B^2$ each independently represent at least one element selected from the group consisting of Be, Mg, Ca, Sr, Ba, Sc, Y, Ti, Zr, Hf, V, Nb, Ta, Cr, Mo, W, Mn, Re, Fe, Os, Co, Rh, Ni, Pd, Cu, Al, Ga, In, Ge, As, Sb, Bi, La, Ce, Pr, Nd, Pm, Sm, Eu, Gd, Dy, Ho, Er, Tm, Yb, and Lu.

17. The method for producing an electrocatalyst for a fuel cell according to claim 15 comprising:

preparing a first aqueous solution, of the halide or nitrate of said A, and a second aqueous solution, which is an aqueous solution of the alkaline metal acid of said B;

forming a precipitate of the pyrochlore oxide by carrying out the reaction by dropping one aqueous solution, which is either the first aqueous solution or the second aqueous solution, in the other; and calcining the precipitate of the pyrochlore oxide at a temperature of at least 250° C. and at most 900° C.

18. The method for producing an electrocatalyst for a fuel cell according to claim 17 further comprising, before the forming of the precipitate of the pyrochlore oxide by the dropping, dispersing a conductive material in either the first aqueous solution or the second aqueous solution.

19. The method for preparing a an electrocatalyst according to claim 15, wherein the inert gas is selected from the group consisting of nitrogen, helium, argon and a combination thereof.

20. The method for preparing a an electrocatalyst according to claim 15, wherein the precipitate of the pyrochlore oxide is calcined at a temperature of at least 250° C. and at most 600° C.

* * * * *